(12) United States Patent
Barbieri

(10) Patent No.: US 10,479,502 B2
(45) Date of Patent: Nov. 19, 2019

(54) AIRCRAFT PROVIDED WITH A WINCH DEVICE

(71) Applicant: AIRBUS HELICOPTERS, Marignane (FR)

(72) Inventor: Andre Barbieri, Sausset les Pins (FR)

(73) Assignee: AIRBUS HELICOPTERS, Marignane (FR)

( * ) Notice: Subject to any disclaimer, the term of this patent is extended or adjusted under 35 U.S.C. 154(b) by 279 days.

(21) Appl. No.: 15/603,909

(22) Filed: May 24, 2017

(65) Prior Publication Data

US 2017/0341748 A1    Nov. 30, 2017

(30) Foreign Application Priority Data

May 25, 2016 (FR) ..................................... 16 00842

(51) Int. Cl.
| | |
|---|---|
| *B64D 1/22* | (2006.01) |
| *B64C 23/00* | (2006.01) |
| *B66D 1/02* | (2006.01) |
| *B66D 1/60* | (2006.01) |
| *B64C 1/00* | (2006.01) |
| *B64C 27/26* | (2006.01) |

(52) U.S. Cl.
CPC .............. *B64D 1/22* (2013.01); *B64C 1/0009* (2013.01); *B64C 23/00* (2013.01); *B66D 1/02* (2013.01); *B66D 1/60* (2013.01); *B64C 27/26* (2013.01)

(58) Field of Classification Search
CPC .... B64D 1/00; B64D 1/22; B64D 9/00; B64C 1/0009; B64C 1/22; B64C 23/00; B64C 27/26; B66D 1/02; B66D 1/34; B66D 1/60
USPC ........................................... 244/137.1, 138 R
See application file for complete search history.

(56) References Cited

U.S. PATENT DOCUMENTS

| | | | |
|---|---|---|---|
| 2,380,290 A | 7/1945 | Burnelli | |
| 3,204,890 A | 9/1965 | Lehn et al. | |
| 3,478,904 A | 11/1969 | Courter | |
| 3,494,595 A * | 2/1970 | Bohan | B64C 1/22 242/125.1 |
| 3,561,704 A * | 2/1971 | Schulze | B64C 1/1415 244/12.3 |
| 4,013,270 A | 3/1977 | Laky et al. | |

(Continued)

FOREIGN PATENT DOCUMENTS

| | | |
|---|---|---|
| DE | 3323513 | 1/1985 |
| EP | 2143633 | 1/2010 |

(Continued)

OTHER PUBLICATIONS

French Search Report for French Application No. FR 1600842, Completed by the French Patent Office, dated Mar. 3, 2017, 8 Pages.

*Primary Examiner* — Tien Q Dinh
*Assistant Examiner* — Brady W Frazier
(74) *Attorney, Agent, or Firm* — Brooks Kushman P.C.

(57) ABSTRACT

An aircraft provided with a wing and a winch device. The winch device is provided with a hoist device that includes a storage drum and a motor member for winding a suspension member around the storage drum and for unwinding said suspension member off the storage drum. The hoist device is surrounded at least in part by a fairing of the winning, said hoist device being arranged in an inside volume of the wing at least in a position referred to as the "streamlined" position.

20 Claims, 4 Drawing Sheets

(56) References Cited

U.S. PATENT DOCUMENTS

| | | | | |
|---|---|---|---|---|
| 4,566,659 | A * | 1/1986 | Luckachina | B64D 1/22 244/137.1 |
| 4,750,691 | A * | 6/1988 | Hollrock | B66C 23/18 212/299 |
| 5,190,250 | A * | 3/1993 | DeLong | B64D 1/22 244/118.1 |
| 8,851,425 | B2 | 10/2014 | Ferrendier et al. | |
| 8,915,466 | B2 * | 12/2014 | Figoureux | B66C 23/18 244/136 |
| 2002/0020783 | A1 * | 2/2002 | Landry | B64D 1/22 244/137.1 |
| 2014/0090232 | A1 * | 4/2014 | Hall | B64C 1/22 29/525.01 |
| 2016/0340038 | A1 * | 11/2016 | Chavez | B64D 1/22 |

FOREIGN PATENT DOCUMENTS

| | | |
|---|---|---|
| FR | 1577830 | 8/1969 |
| FR | 2346276 | 10/1977 |
| FR | 2955832 | 8/2011 |
| FR | 2966802 | 5/2012 |
| GB | 297156 | 9/1928 |
| GB | 755965 | 8/1956 |
| GB | 860009 | 2/1961 |
| GB | 1233364 | 5/1971 |
| GB | 2303837 | 3/1997 |

\* cited by examiner

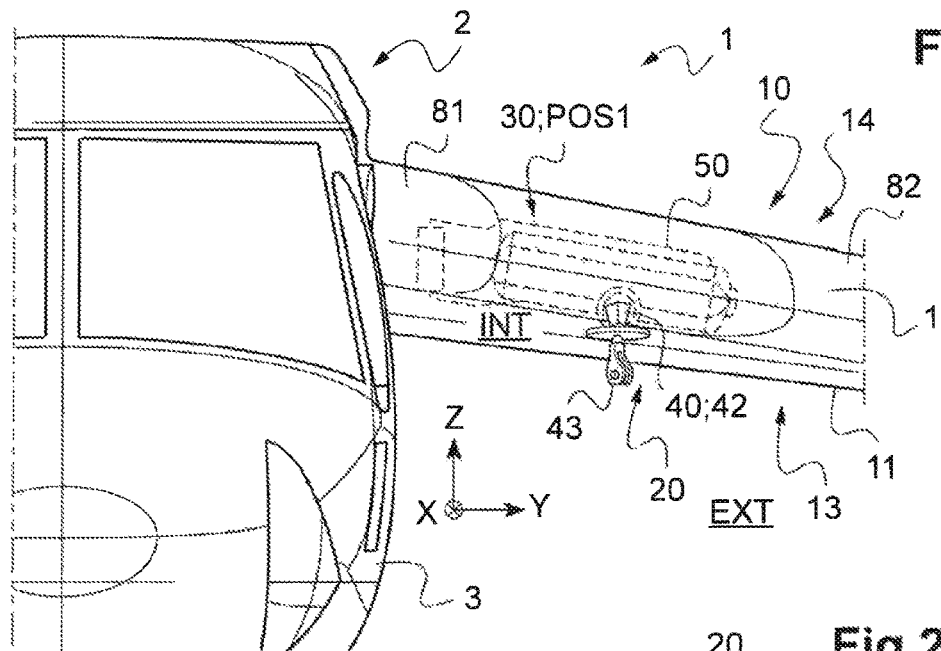
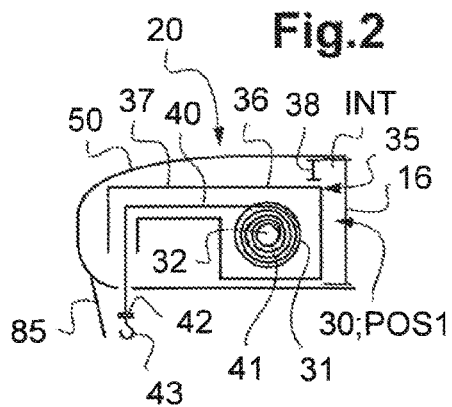
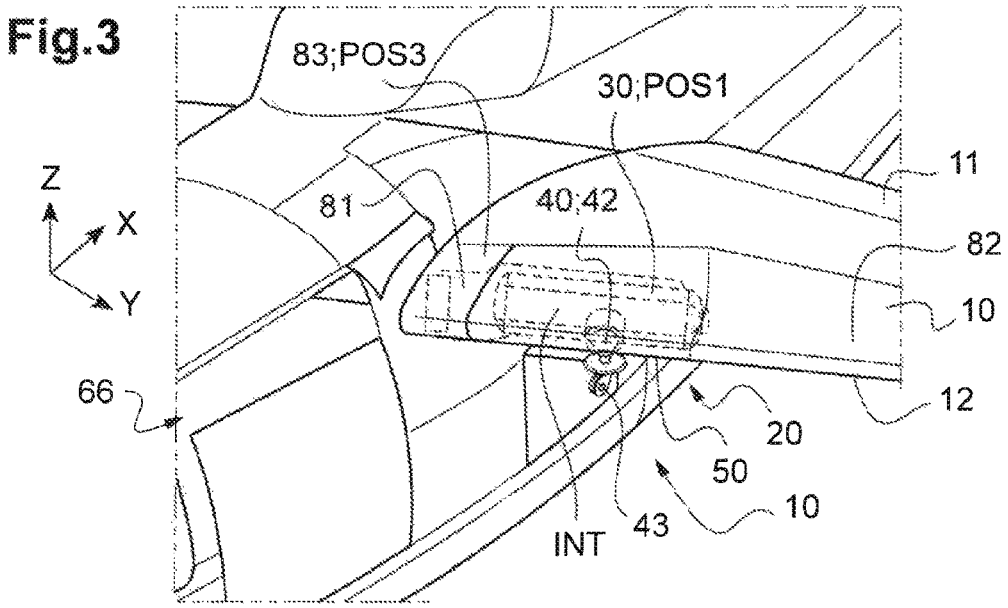

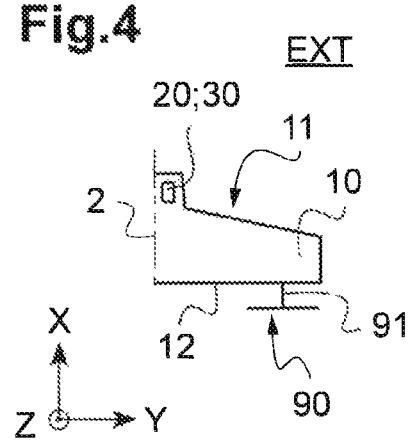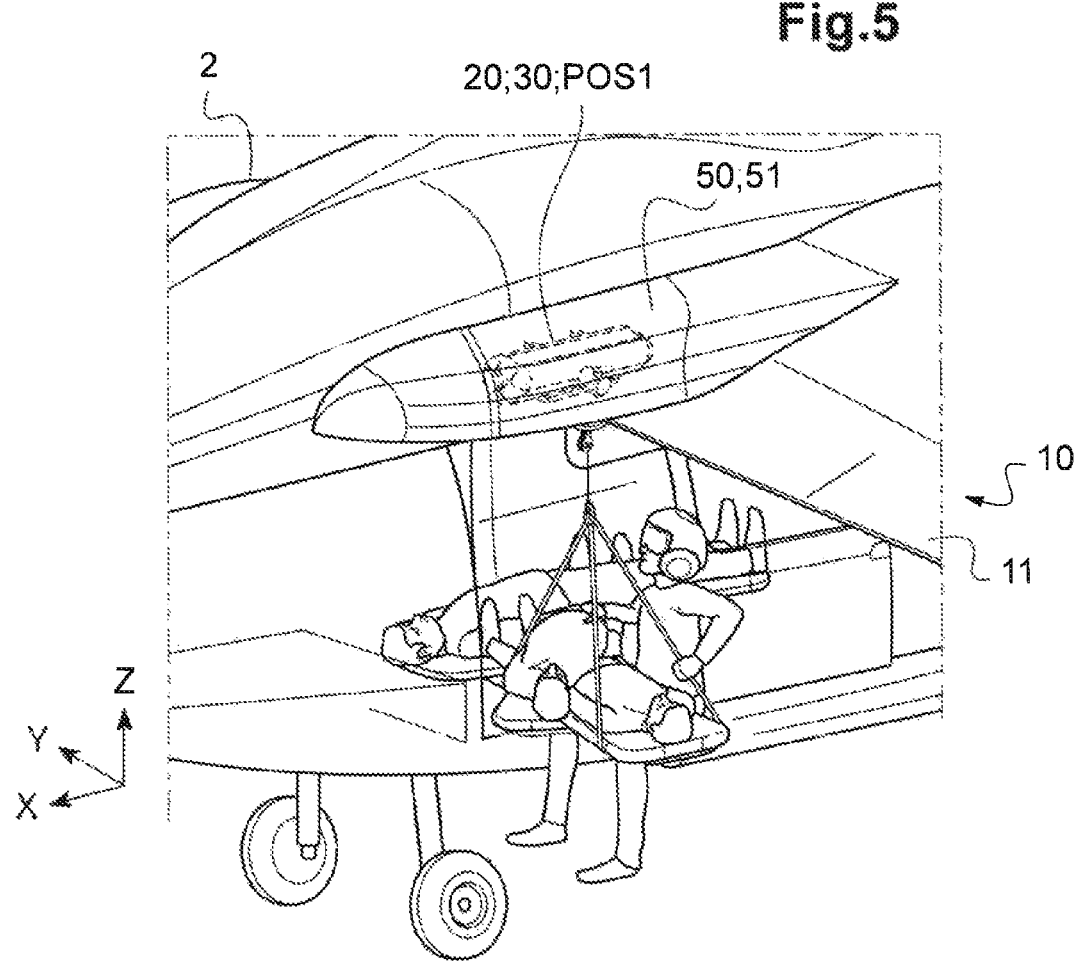

AIRCRAFT PROVIDED WITH A WINCH DEVICE

CROSS-REFERENCE TO RELATED APPLICATIONS

This application claims priority to European patent application No. FR 16 00842 filed on May 25, 2016, the disclosure of which is incorporated in its entirety by reference herein.

BACKGROUND OF THE INVENTION

(1) Field of the Invention

The present invention relates to an aircraft provided with a winch device. The technical field of the invention is thus the technical field of winch equipment for an aircraft.

(2) Description of Related Art

Specifically, an aircraft, and more particularly an aircraft capable of flying at low speed, may be equipped with a winch device in order to transport external loads. By way of illustration, a rotorcraft is sometimes equipped with such a winch device. A winch device makes it possible to hoist external loads into the aircraft, or indeed to transfer external loads from the aircraft to the outside.

The term "external load" applies not only to inanimate objects, but also to living beings that can be carried by the winch device. A winch device is thus used in particular in the context of rescue missions, or indeed during commercial activities.

Such a winch device may include a hoist device capable of lowering or raising a suspension member relative to the fuselage of the aircraft. By way of example, such a suspension member may comprise a suspension cable.

Such a hoist device is commonly referred to as a "winch" by the person skilled in the art. A hoist device conventionally comprises a motor driving rotation of a storage drum having the suspension member wound partially thereabout. The term "wound partially" means that a portion of the suspension member may be wound around the storage drum, with another portion of the suspension member projecting from the hoist device in order to be secured to an external load.

Arranging a hoist device in an aircraft can give rise to difficulties.

A hoist device may thus be arranged outside the fuselage of the aircraft, e.g. being carried by a flank of the aircraft. Optionally, the hoist device is carried by a movable boom.

This type of arrangement can nevertheless be limiting because of the aerodynamic drag of the hoist device while the aircraft is travelling.

Alternatively, the hoist device may be arranged inside the fuselage of the aircraft. The suspension member then runs inside the fuselage in order to reach the outside medium.

Arranging the hoist device inside the fuselage can sometimes be difficult because of its size.

Document EP 2 143 633 describes a winch device and a method of retrieving a rescue cradle.

That winch device includes a pivotally-mounted door supporting a hoist device. When the door is open, the hoist device is situated outside the fuselage of an aircraft. Conversely, when the door is closed, the hoist device is positioned inside the fuselage.

That system enables the hoist device to be positioned inside the fuselage except while performing a recovery operation, so as to avoid increasing the aerodynamic drag of the aircraft. Nevertheless, the hoist device does indeed reduce the volume available inside the fuselage.

Document US 2002/0020783 describes a winch device. The winch device is provided with a removable hoist device and with a fixed portion arranged inside a fuselage, and thus to the detriment of the available volume.

Document FR 2 966 802 describes a winch device. That winch device comprises a hoist device arranged inside the fuselage of an aircraft and a boom for guiding the suspension member of the hoist device.

Document U.S. Pat. No. 4,750,691 describes a winch device. That winch device comprises a hoist device arranged inside the fuselage of an aircraft and a guide boom. The guide boom can pivot between a deployed position for winching and a retracted position.

When in a retracted position, such a guide boom might possibly obstruct an access into a cabin.

Document U.S. Pat. No. 3,561,704 describes a winch device of an airplane. That winch device includes a pivotally-mounted door supporting a hoist device. The hoist device can slide on a rail that extends in part over a ceiling of the fuselage and over the door.

Document DE 3 323 513 describes a winch device. That winch device includes a hoist device secured to a guide boom. The hoist device and the guide boom are movable in translation between a retracted position stowed inside a cabin, and a deployed position for winching.

Document FR 1 577 830 describes a winch device. That winch device includes a hoist device. The hoist device is carried on a pivotally-mounted support, so as to pivot between a retracted position for stowing inside a cabin, and a deployed position for winching.

Document FR 2 346 276 describes a winch device. That winch device includes a hoist device provided with a guide boom. The hoist device and the guide boom slide on a rail between a retracted position and an extended position.

Document U.S. Pat. No. 3,478,904 is remote from the field of the invention since it describes a cargo loading mechanism for facilitating loading and unloading freight in an aircraft.

Document FR 2 955 832 describes a removable support for a hoist device. In the assembled position, the removable support is arranged outside a fuselage at a door giving access to the inside of the fuselage.

Document GB 2 303 837 describes a winch device. That winch device includes a hoist device fastened to the outside of a fuselage. Furthermore, the hoist device has a removable deflector that is used to deflect the suspension cable of the hoist device away from the landing gear of the aircraft. That deflector is either stored against a vertical skin of the fuselage of the aircraft, or else is slidably mounted under a floor of a cabin.

Document U.S. Pat. No. 4,566,659 describes a winch device. That winch device includes a hoist device fastened to the outside of a fuselage. The hoist device is mounted on a pivotable support that is fastened to a flank of the aircraft. The pivotable support enables the hoist device to be moved to give access to an engine during maintenance of the engine.

Document US 2014/0090232 describes a rotary system with a screw for varying the angle of inclination of a hoist device situated on the outside of a fuselage of the aircraft. That rotary system makes it possible to lower the hoist device in order to access the engine of the aircraft during maintenance.

Document GB 860 009 describes a hoist device fastened to the inside of a door.

Document U.S. Pat. No. 5,190,250 describes a hoist device integrated in a pod placed under a wing of a helicopter.

Documents GB 755 965, U.S. Pat. Nos. 3,204,890, 2,380,290, GB 297 156, U.S. Pat. Nos. 5,190,250, 4,750,691, DE 3 323 513, and US 2016/340038 are known.

BRIEF SUMMARY OF THE INVENTION

An object of the present invention is thus to propose a different winch device seeking to avoid some of the above-mentioned drawbacks.

The invention thus provides an aircraft. This aircraft is provided with a wing extending longitudinally from a streamlined edge referred to as the "trailing" edge towards a streamlined edge referred to as the "leading" edge. The aircraft is provided with a winch device, the winch device being provided with a hoist device that includes a storage drum. The winch device is also provided with a suspension member that extends from a first end towards a second end that is free and that projects from the hoist device, the hoist device including a motor member for winding the suspension member around the storage drum and for unwinding the suspension member off the storage drum.

The hoist device is surrounded at least in part by a fairing of the wing, the hoist device being arranged in an inside volume of the wing in a position referred to as the "streamlined" position occupied by the hoist device and by the fairing.

The second end of the suspension member may be arranged outside the wing during winching operations, and inside the wing other than during a winching operation.

Optionally, a hook attached to the second end may be permanently situated at least in part outside the wing. Under such circumstances, the suspension member may be kept under tension while not performing a winching operation in order to avoid the hook moving in flight, e.g. by blocking an abutment of the hook against the wing or against the hoist device.

The term "fairing" designates a wall that is in contact with a medium outside the aircraft.

The term "a motor member for winding said suspension member around the storage drum and for unwinding said suspension member off the storage drum" means that the motor member acts either on the suspension member or else on the storage drum or indeed on some other member of the hoist device in order to be able to wind and unwind the suspension member around the storage drum.

For this purpose, the motor member thus includes at least one motor, e.g. such as an electric motor.

Furthermore, the suspension member may include at least one cable and/or at least one chain, for example. The suspension member is also partially wound around the storage drum, at least when the suspension member is not fully unwound off the storage drum.

The hoist device may be of any known type including at least one motor and at least one storage drum. For example, the hoist device may be of the type known under the trade name Goodrich 44312.

The hoist device is incorporated in a wing by being arranged inside the wing, at least while the hoist device is in a position referred to as the "streamlined" position. In this streamlined position, the fairing defines in part the inside volume receiving the hoist device. Optionally, the hoist device may be arranged outside the inside volume when the hoist device is in another position.

Under such circumstances, the hoist device is arranged within the wing at least during certain stages of flight, and not in a pod fastened under the wing. Under such circumstances, the hoist device also differs from devices arranged in a cabin and tending to reduce the available volume inside the cabin, or indeed to partially obstruct a door giving access to the cabin.

Arranging the device outside the cabin also tends to avoid lubricant being squirted into the cabin, for example.

Also, by incorporating the hoist device inside the wing in the streamlined position, the aerodynamic drag of the winch device is optimized. This characteristic explains why the term "streamlined position" is used to designate the position occupied by the hoist device when it is in this configuration.

Furthermore, the fairing is one of the elements constituting the wing. Consequently, the fairing acts as means for protecting the hoist device and the skin of the wing.

Furthermore, the second end of the suspension member always projects from the wing, at least during winching operations. This second end may be connected to a device for fastening a load, e.g. such as a hook. Thus, by way of example, the hoist device may carry a person, a stretcher via pendants, or indeed a device suitable for going through the foliage of trees in a forest. Such a device suitable for going through tree foliage is sometimes referred to as a "jungle penetrator".

The aircraft may also include one or more of the following characteristics.

Thus, in an embodiment, the hoist device is arranged in one of the streamlined edges of the wing, the fairing being a portion of the streamlined edge containing the hoist device.

In this first embodiment, the hoist device is incorporated in the leading edge or in the trailing edge of the wing. The fairing then constitutes a portion of a leading edge fairing or of a trailing edge fairing.

Also, the wing may carry a propeller arranged longitudinally beside one of the streamlined edges. Under such circumstances, the hoist device may be arranged in the other streamlined edge.

For example, the propeller may be carried by a mast projecting from the leading edge. Under such circumstances, in this alternative, the hoist device may be arranged in a trailing edge fairing. Conversely, if the propeller is carried by a mast projecting from the trailing edge, then the hoist device may be arranged in a leading edge fairing.

This alternative seeks to limit any risk of interference between a propeller and a load being winched by the winch device.

Also, when the hoist device is arranged in a streamlined edge, the hoist device in its streamlined position may extend mainly in the span direction of the wing.

The term "mainly" means that the largest dimension of the hoist device extends substantially in the associated direction.

Furthermore, the streamlined edge containing the hoist device may comprise in succession: a root segment, said fairing, and then an end segment.

The streamlined edge of the wing co-operating with the hoist device may thus comprise a root segment to which the fairing of the hoist device does not belong, in order to keep the hoist device away from the fuselage. For example, the root segment may extend in the span direction over a length of about 50 centimeters (cm).

After the root segment, the streamlined edge includes the fairing. This fairing may be arranged in continuity with the root segment in the streamlined position, an outside surface of the fairing being flush with an outside surface of the root segment. For example, the fairing may extend in the span direction over a length of about one meter so that in forward flight the hoist device does not disturb the streamlined flow of air around the wing.

Finally, after the fairing, the streamlined edge includes an end segment. This end segment may be arranged in continuity with the fairing in the streamlined position, an outside surface of the fairing being flush with an outside surface of the end segment. In this position, the root segment, the fairing, and the end segment together form a surface that is substantially continuous.

In a second embodiment, the fairing is a wing-fuselage fairing.

Such a wing-fuselage fairing is usually used to avoid turbulent flow forming.

For example, a streamlined edge, and in particular a trailing edge, may present insufficient thickness between its suction side and its pressure side to receive the hoist device therein.

This second embodiment proposes remedying this difficulty in particular by arranging the hoist device in a wing-fuselage fairing so as to provide streamlined continuity of the wing without deforming the streamlined edge.

The wing-fuselage fairing may present thickness of the same order as the maximum thickness of the wing, for example.

In this second embodiment, the hoist device, in its streamlined position, may equally well extend mainly longitudinally.

In another aspect, the suspension member may pass through the fairing.

The suspension member may thus extend outside the aircraft.

In another aspect, the winch device may include a movable arm carried by a hinge, the hinge giving the movable arm at least one degree of freedom to move in rotation about an axis of rotation relative to the wing, the hoist device being carried by the movable arm, the movable arm and the fairing being movable together between the streamlined position and a position referred to as the "extended" position.

The term "hinge" designates a mechanical system having one member that is stationary relative to the wing and the fuselage, with the mechanical system providing a degree of freedom to move in rotation between two elements.

For example, the hinge may comprise a lug fastened to the wing or to the fuselage, and a pin passing both through the lug and through a fork of the movable arm.

The fairing may be fastened to the hoist device and/or to the movable arm using conventional mechanical connections, e.g. such as fastener tabs.

The movable arm and the hoist device and the fairing can then be moved together at least in rotation about the axis of rotation. The axis of rotation may be an axis extending in elevation, i.e. substantially in the direction going from the pressure side to the suction side of the wing.

Under such circumstances, the hoist device may be moved so as to facilitate using the hoist device, or indeed so as to facilitate loading a load, for example. In the extended position, the hoist device may, for example, be closer to a cabin than it is in the streamlined position.

In another arrangement, the hoist device in the streamlined position may be closer to a cabin than it is when in the extended position. For example, during a rescue mission, a person may be winched towards the aircraft with the hoist device positioned in the extended position. When the person comes close to the aircraft, the hoist device is positioned in its streamlined position in order to facilitate loading the person into the aircraft.

Furthermore, the fairing may close the inside volume in the streamlined position, and the fairing may open the inside volume to a medium outside the aircraft in the extended position.

The term "close" means that the fairing then defines the outside of the inside volume. For this purpose, the fairing has an outside surface flush with an adjacent outside surface of the wing.

In another aspect, the winch device may include a motor-driven system connected to the movable arm to move the movable arm in rotation about the axis of rotation.

The motor-driven system may include a motor, e.g. an electric motor, or indeed an actuator capable of exerting a force on the movable arm in order to move it.

In another aspect, the aircraft has a fuselage provided with at least one frame and a skin that is fastened to the frame, and the hinge may be fastened to the frame.

The hinge is installed on a frame of the fuselage, e.g. a frame situated in the proximity of a side door. A stationary member of the hinge is advantageously installed at the junction between the frame of the door and a frame that is connected to a wing.

A door frame needs to be a structural frame member. The root of a wing likewise requires a structural frame member. A stationary member of the hinge can then be situated at the junction between the frame members constituting a zone that is specifically structurally reinforced. The arrangement of the invention then does not require additional reinforcement to be added, which would have a non-negligible weight penalty.

In another alternative, the stationary member of the hinge may be secured, by way of example, to a floor or to a ceiling of the aircraft. In particular, the stationary member of the hinge may be secured to the transmission support platform of the aircraft carrying the powerplant of the aircraft.

In another alternative, the hinge is fastened to a member of the wing.

A stationary member of the hinge may be fastened to the fuselage, however it could alternatively be fastened inside the wing, e.g. being fastened to a spar or a rib of the wing.

In another aspect, and where appropriate, the root segment includes at least one movable flap and a movement system, the movement system co-operating with the flap to move the flap between a closed position and an open position, the flap in the closed position impeding movement of the movable arm, but not impeding said movement when in the open position.

In the presence of a root segment and of a movable arm, the root segment may open by moving at least one flap. The streamlined edge is split in elevation into two portions so as to present a notch in the open position in order to avoid impeding movement of the movable arm.

This system is particularly advantageous if the movable arm passes through the root segment in order to be hinged to a hinge that is secured to the fuselage of the aircraft.

Under the action of the movable arm, a lever may be moved, e.g. to enable a flap to turn vertically. A motor or an actuator could also be used for moving a flap.

In another aspect, the wing may include at least one deflector to deflect a stream of air that might impact against the winch device.

By way of example, a hook fastened to the second end of the suspension member may have a deflector added in front of it relative to the forward travel direction of the aircraft.

In another aspect, the aircraft may be an aircraft suitable for performing hovering flight.

The hoist device may in particular be positioned under the center of thrust of the wing in order to optimize balancing the aircraft.

The aircraft may be a vertical takeoff and landing aircraft, and/or an aircraft capable of remaining in a stationary position in flight. The aircraft may specifically be a rotorcraft, and in particular a helicopter, for example.

The aircraft may also be an unmanned aircraft of the drone type.

Arranging a hoist device in a wing of a drone makes it possible to optimize the volume available in the fuselage of the drone, e.g. in order to arrange equipment of various types therein, such as but not limited to a camera, a battery, a tank, and the like.

In another aspect, a plurality of winch devices of the invention may be arranged in a wing, discontinuously or continuously, or in a plurality of wings.

For example, a wing may comprise two half-wings arranged transversely on either side of the fuselage, and each half-wing may contain one such winch device.

BRIEF DESCRIPTION OF THE DRAWINGS

The invention and its advantages appear in greater detail in the context of the following description of embodiments given by way of illustration and with reference to the accompanying figures, in which:

FIG. 1 is a face view of an aircraft of the invention;

FIG. 2 is a diagrammatic view showing a hoist device and a fairing;

FIG. 3 is a side view of an aircraft of the invention;

FIG. 4 is a diagrammatic view showing a winch device arranged in a trailing edge;

FIG. 5 is a diagrammatic view showing a winch device arranged in a wing-fuselage fairing;

DETAILED DESCRIPTION OF THE INVENTION

Figure 6:
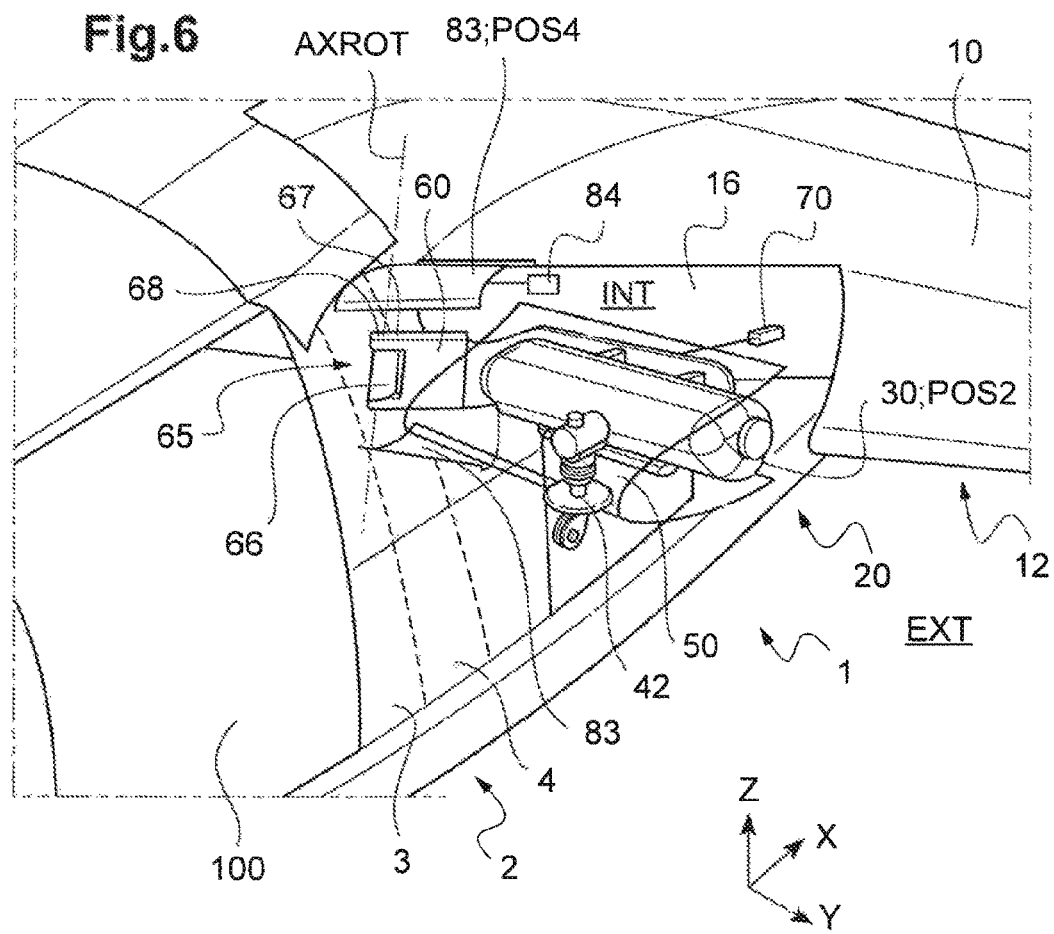
FIG. 6 is a view explaining the movement of a movable arm.

Elements that are present in more than one of the figures are given the same references in each of them.

It should be observed that three mutually orthogonal directions X, Y, and Z are shown in some of the figures.

The first direction X is said to be "longitudinal". The terms "longitudinally" and "longitudinal" relate to any direction parallel to the first direction X.

The second direction Y is said to be "transverse". The term "transverse" relates to any direction parallel to the second direction Y.

Finally, the third direction Z is said to be "in elevation". The term "in elevation" relates to any direction parallel to the third direction Z.

FIG. 1 shows an aircraft 1 of the invention.

The aircraft 1 may be an aircraft capable of flying at low speed, or indeed of hovering. In particular, the aircraft 1 may be an aircraft capable of taking off or landing vertically, or indeed of hovering in a stationary position. Under such circumstances, the aircraft 1 may be a rotorcraft having a rotary wing, at least during certain stages of flight.

The aircraft 1 may include a cockpit, but it could equally well be an unmanned drone.

The aircraft 1 has a fuselage 2 and at least one wing 10. Conventionally, the fuselage 2 comprises in particular structural frames that are not visible in FIG. 1 together with an outside skin 3.

The wing 10 extends laterally from at least one flank of the fuselage 2. The wing 10 thus includes at least one streamlined segment that conventionally extends spanwise from the fuselage towards a free end. Also, the wing 10 extends longitudinally from rear to front going from a streamlined edge referred to as the "trailing" edge 11 to a streamlined edge referred to as the "leading" edge 12. The wing also extends in a thickness direction from a pressure side face 13 to a suction side face 14.

The wing 10 comprises an outer skin and structural members arranged inside the skin. Thus, the wing has at least one spar, and possibly ribs, stiffeners, filler means, . . . .

Furthermore, the aircraft 1 has a winch device 20 for carrying a load.

With reference to FIG. 2, the winch device 20 comprises a hoist device 30 carrying a suspension member 40.

The hoist device 30 is integrated inside the wing when in the streamlined position POS1 shown in FIG. 2.

Under such circumstances, the hoist device is arranged in this streamlined position POS1 within an inside volume INT of the wing. This inside volume INT is defined by at least one fairing 50. This fairing 50 forms a portion of the outer skin of the wing in the streamlined position POS1, and it surrounds the hoist device 30, at least in part.

With reference to FIG. 2, the hoist device 30 has at least one storage drum 31, at least one motor member 32, and a suspension member 40 that may be partially wound around the storage drum.

The suspension member 40 is an elongate member suitable for carrying a load. The suspension member 40 extends from a first end 41 to a second end 42. For example, the first end 41 is fastened to the storage drum 31. Conversely, the second end 42 projects from the hoist device 30 and the wing. This second end 42 may include a fastener system 43, such as a hook, for example.

The motor member 32 then has the function of winding the suspension member, upstream from its second end, around the storage drum 31 in order, on request, so as to shorten the length of the suspension member 40 that extends outside the wing 10. Furthermore, the motor member 30 also has the function of unwinding the suspension member off the storage drum 31, on request, so as to increase the length of the suspension member 40 that extends outside the wing 10.

For this purpose, and by way of example, the motor member 32 comprises a motor suitable for rotating the storage drum 31 in a first direction for winding in the suspension member 40, and in a second direction for unwinding the suspension member 40. This motor member 32 may be controlled by conventional control means, such as a winch handle located remotely in a cabin of the fuselage, for example.

Furthermore, the hoist device 30 may include an outer casing 35. Such an outer casing 35 may comprise a main casing 36 containing the storage drum 31 and the motor member 32. Furthermore, the outer casing may include a boom 37, which may, for example, include a bend and be secured to the main casing 36. The suspension member 40 passes through the boom 37. The suspension member 40 that leaves the boom in order to enter the medium EXT outside the wing, possibly by passing through an opening in the fairing 50.

For example, the hoist device is an angle-takeoff winch of the Goodrich 44312 type.

The fairing 50 may optionally be fastened to the hoist device 30. For example, fastener tabs 38 fasten the hoist device mechanically to a wall of the fairing 50.

In another aspect, at least one deflector 85 is fastened to the wing 10 in order to deflect an air stream that might impact against the winch device, and for example a hook carried by the second end 42 of the suspension member. The deflector 85 may comprise at least one plate suitable for deflecting such an air stream, which plate is secured to the wing.

With reference to FIG. 3, the hoist device 30 may be arranged in one of the streamlined edges 11, 12 of the wing 10. The streamlined edge containing the hoist device is referred to for convenience as the "winching streamlined edge". Consequently, the fairing 50 represents a portion of the skin of this winching streamlined edge.

In particular, the fairing may represent a portion of the root of this winching streamlined edge so as to be arranged as close as possible to the fuselage.

In another alternative, the fairing does not join the fuselage. Under such circumstances, the winching streamlined edge comprises in succession, starting from the fuselage: a root segment 81, the fairing 50, and then an end segment 82.

Whatever the alternative, and as shown in FIG. 3, the winch device 20 may be arranged in the leading edge 12 of the wing.

In FIG. 4, the winch device 20 is arranged in the trailing edge 11 of the wing.

Which position is chosen for the winch device 20, i.e. in the trailing edge 11 or in the leading edge 12 of the wing, may depend on the thickness of the trailing edge 11 and on the thickness of the leading edge 12, or indeed on the position of the wing relative to a side access door of the aircraft.

Likewise, the aircraft 1 may optionally include at least one propeller 90 carried by the wing 10. The propeller 90 is arranged longitudinally on one side of the wing 10, i.e. beside the trailing edge 11 or beside the leading edge 12 of the wing, as shown in FIG. 4. The propeller is arranged in particular beside a given streamlined edge when the propeller 90 projects longitudinally from that given streamlined edge and/or when the shaft 91 driving the propeller 1 in rotation projects longitudinally from that given streamlined edge.

Under such circumstances, the winch device 20 may be arranged in the streamlined edge that is not located beside the propeller 90.

In the example of FIG. 4, the propeller 90 is thus beside the leading edge 12, and the winch device 20 is located in the trailing edge 11.

In another aspect, when the hoist device 30 is arranged in one of the streamlined edges of the wing 10, the hoist device 30 may optionally extend mainly in the span direction of the wing 10.

In FIG. 5, the fairing 50 may be in the form of a wing-fuselage fairing 51 of the wing 10.

For example, if the trailing edge is of small thickness, the wing may have a wing-fuselage fairing 51 receiving the winch device.

The hoist device 30 may then extend mainly longitudinally parallel to the longitudinal direction X, and not along the span of the wing.

Regardless of whether the winch device is arranged in a wing-fuselage fairing or in a streamlined edge of the wing, the fairing 50 and the hoist device 30 may be permanently fixed in the mounting position, i.e. except during maintenance operations. Under such circumstances, the hoist device is always in the streamlined position.

Nevertheless, the fairing 50 and the hoist device 30 may be movable in the mounted position so as to position the hoist device optimally relative to the fuselage during a winching operation.

FIG. 6 shows such a movable hoist device 20 arranged in a streamlined edge, and in particular in the leading edge of the wing 10.

Independently of the arrangement of the winch device 20, the winch device 20 may then include a movable arm 60.

The movable arm is hinged to the wing 10 or to the fuselage 2 by a hinge 65. This hinge 65 allows the movable arm 60 to move relative to the wing 10 and to the fuselage 2 about at least one axis of rotation AXROT. This axis of rotation AXROT extends mainly in elevation Z so that the winch device rotates in a plane that is optionally substantially horizontal in the reference frame of the aircraft. By way of example, the axis of rotation AXROT is substantially parallel to the axis of rotation of a lift rotor on the rotorcraft, and substantially parallel to the segment of the suspension member projecting from the wing 10 during hovering flight without wind.

In the example of FIG. 6, the hinge 65 is fastened to a frame 4 of the fuselage arranged around a side access to the inside of the fuselage. In particular, this hinge 65 comprises a lug 66 fastened to the fuselage 2, a fork 67 secured to the movable arm 60, and at least one pin 68 passing through the lug and the fork.

For example, the hinge 65 comprises a lug 66 fastened to a frame of the fuselage 2. A fork 67 is secured to the movable arm 60, the fork 67 having two cheeks arranged on either side of the lug. A pin 68 passes in succession through a first cheek of the fork, through the lug, and then through the second cheek of the fork.

In another variant that is not shown, the hinge comprises a member that is fastened not to the fuselage, but to a member of the wing, and by way of non-exclusive example, to the spar 16 that can be seen in FIG. 6.

Whatever the variant, the hoist device 30 and the fairing 50 are constrained to move in rotation with the movable arm about the axis of rotation AXROT. For example, the hoist device 30 and/or the fairing 50 are carried by the movable arm 60, being fastened to the movable arm by conventional fastener means.

The movable arm 60 and the fairing 50 are thus movable together between the streamlined position POS1 and a position referred to as the "extended" position.

In the streamlined position POS1, the fairing 50 closes the inside volume INT. The wing has a conventional appearance, since the hoist device is masked inside the wing. Only the hook fastened to the second end 42 of the suspension member projecting outside the wing gives a hint as to the presence of such a hoist device.

In contrast, when in the extended position POS2 shown in FIG. 6, the fairing 50 opens the inside volume INT to the medium EXT outside the aircraft 1.

In order to move the movable arm 60, the winch device 20 may include a motor-driven system 70, e.g. connected to the movable arm 60. The motor-driven system then comprises a motor and a control member controlling the motor so as to cause the movable arm 62 move in rotation about the axis of rotation AXROT.

For example, the motor is fastened firstly to the movable arm 60 and secondly to a member of the wing, or to the hinge 65, or indeed to the fuselage.

When the winch device is fastened to a streamlined edge having a root segment 81, the root segment 81 may include at least one flap 83 that is movable relative to the other elements of the wing. In the example shown in FIG. 6, the root segment 81 may have two flaps 83 that open like an oyster.

A movement system is connected to at least one of the flaps 83 in order to move the flap between a closed position POS3 and an open position POS4 that can be seen in FIG. 6. The movement system 84 may comprise a motor, or a mechanical system connected to the movable arm, for example.

Specifically, when the movable arm is fastened to the fuselage, movement in rotation of the movable arm can be impeded by a skin of the root segment.

Under such circumstances, this optional characteristic enables the flap 83 to be put into a closed position POS3 impeding movement of the movable arm 60 when the movable arm is in the streamlined position POS1. The wing 10 is then in a configuration equivalent to the configuration of FIG. 3. Together, the flap 83 and the fairing thus form a continuous skin of the streamlined edge.

In contrast, when the movable arm is caused to move in rotation, each of the flaps opens in order to reach the open position POS4 so as to avoid impeding the movement of the movable arm.

For example, each of the flaps 83 and the movable arm 60 are respectively in the closed position POS3 and in the streamlined position POS1 except when performing winching operations. The wing is then perfectly streamlined.

During winching, the flaps 83 and the movable arm 60 may for example be respectively in the closed position POS3 and in the streamlined position POS1 while a load is being hoisted towards the aircraft or lowered towards the ground. In contrast, the flaps 83 and the movable arm 60 are positioned in the open position POS4 and in the extended position POS2 in order to bring the load to the fuselage when loading the load into the aircraft or when unloading the load from the aircraft.

Figure 7:
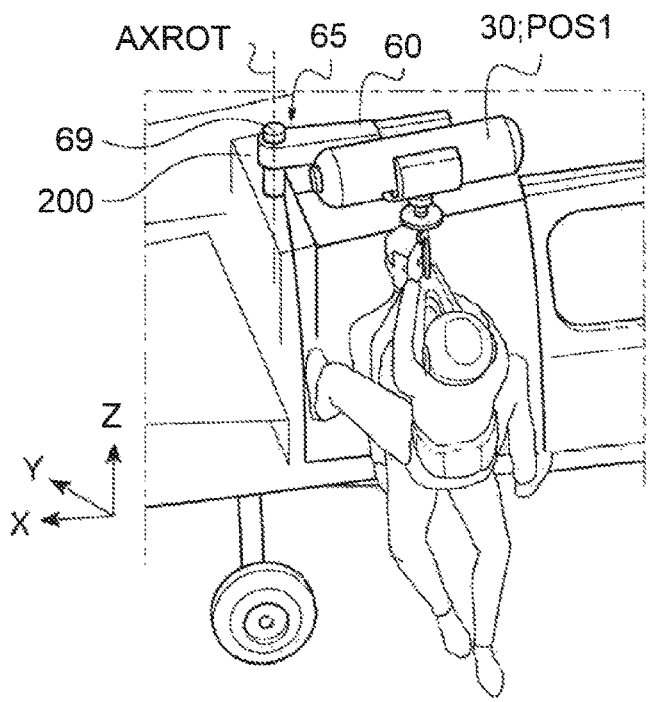
FIGS. 7 to 9 are views showing a winch device having a movable hoist device arranged in a wing-fuselage fairing.
Figure 8:
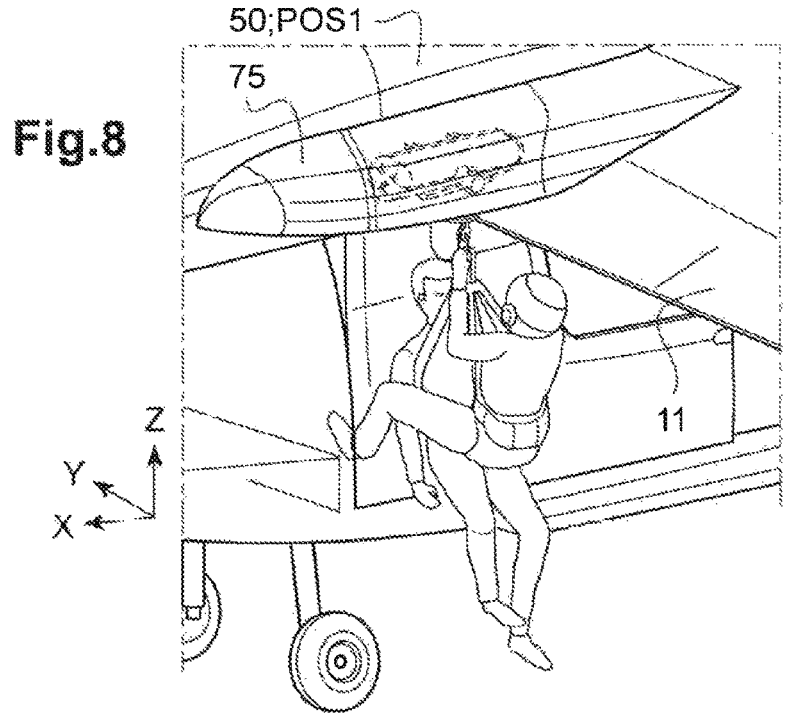
Figure 9:
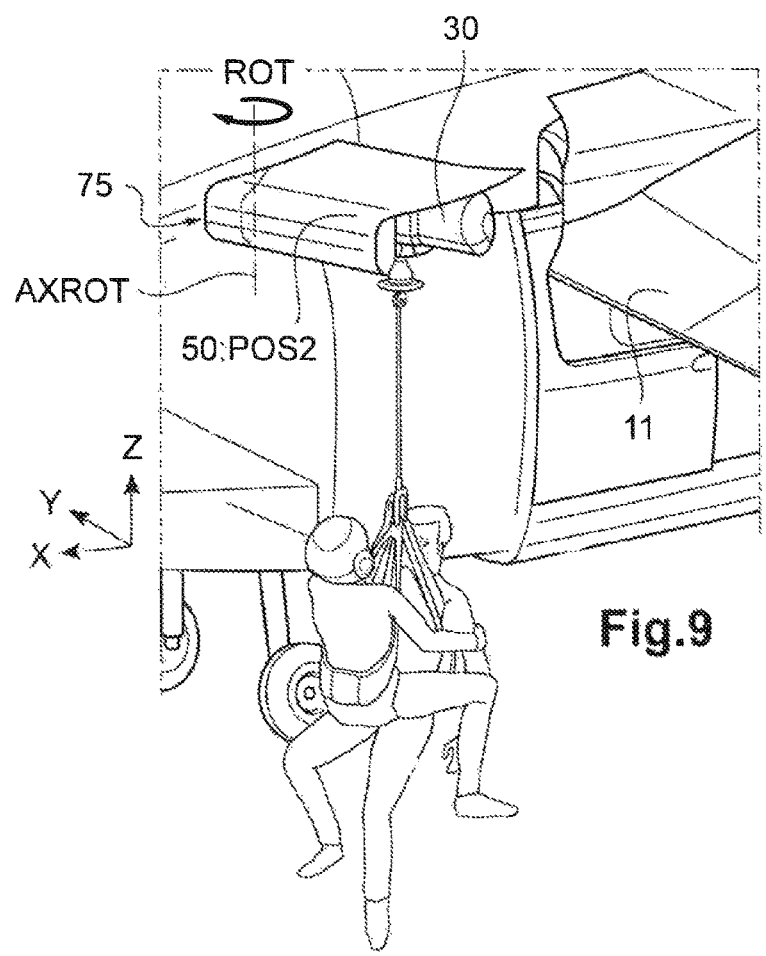

FIGS. 7 to 9 show a movable winch device arranged in a wing-fuselage fairing.

In particular, FIG. 7 shows the hoist device 30 and the movable arm 60. The fairing has been removed in order to enable the hoist device 30 to be seen clearly.

In this configuration, the hinge 65 may be fastened to a transmission support platform of the fuselage, for example. For example, the hinge 65 has a rod 69 connected to the transmission support platform 200. Under such circumstances, the movable arm 60 has a lug arranged around the rod 69.

In FIG. 8, the fuselage 2 may have a fixed cap 75 extending the fairing 50 in the streamlined position.

In the streamlined position POS1, the fairing 50 does not cover the fixed cap 75.

With reference to FIG. 9, when the fairing 50 and the movable arm 60 and the hoist device 30 move in rotation ROT to reach the extended position POS2, the fairing slides over the skin of the fixed cap 75 and covers the fixed cap 75 in part.

During winching, the fairing 50 and the movable arm 60 and the hoist device 30 may be in the extended position POS2 of FIG. 9, e.g. while a load is being hoisted towards the aircraft or lowered towards the ground. In contrast, the fairing 50 and the movable arm 60 and the hoist device 30 are positioned in the streamlined position POS1 of FIG. 8 in order to bring the load towards the fuselage during an operation of loading the load into the aircraft or of unloading the load from the aircraft.

Naturally, the present invention may be subjected to numerous variations as to its implementation. Although several embodiments are described, it should readily be understood that it is not conceivable to identify exhaustively all possible embodiments. It is naturally possible to envisage replacing any of the means described by equivalent means without going beyond the ambit of the present invention.

What is claimed is:

1. An aircraft comprising:
a wing extending longitudinally from a streamlined leading edge towards a streamlined trailing edge,
the aircraft being provided with a winch device,
the winch device being provided with a hoist device including a storage drum,
the winch device being provided with a suspension member extending from a first end to a second end that is free and that projects from the hoist device,
the hoist device including a motor member for winding the suspension member around the storage drum and for unwinding the suspension member off the storage drum,
the hoist device being at least partially surrounded by a fairing of the wing,
the hoist device being arranged in an inside volume of the wing in a streamlined position,
wherein the winch device includes a movable arm carried by a hinge,
the hinge giving the movable arm at least one degree of freedom to move in rotation about an axis of rotation relative to the wing,
the hoist device being carried by the movable arm, and
the movable arm and the fairing being movable together between the streamlined position and an extended position.

2. The aircraft according to claim 1, wherein the fairing is a fuselage fairing of the wing.

3. The aircraft according to claim 1, wherein the hoist device is arranged in one of the streamlined edges of the wing, the fairing is a portion of the streamlined edge containing the hoist device.

4. The aircraft according to claim 3, wherein the wing carries a propeller arranged longitudinally beside one of the streamlined edges, and the hoist device is arranged in the other streamlined edge.

5. The aircraft according to claim 3, wherein the streamlined edge containing the hoist device comprises in succession a root segment, the fairing, and then an end segment.

6. The aircraft according to claim 1, wherein the suspension member passes through the fairing.

7. The aircraft according to claim 1, wherein, in the streamlined position, the fairing closes the inside volume, and, in the extended position, the fairing opens the inside volume to a medium outside the aircraft.

8. The aircraft according to claim 1, wherein the winch device includes a motor-driven system connected to the movable arm to move the movable arm in rotation about the axis of rotation.

9. The aircraft according to claim 1, wherein the aircraft includes a fuselage provided with at least one frame and a skin fastened to the frame, and the hinge is fastened to the frame.

10. The aircraft according to claim 1, wherein the hinge is fastened to a member of the wing.

11. The aircraft according to claim 5, wherein the root segment includes at least one movable flap and a movement system, the movement system co-operating with the flap to move the flap between a closed position and an open position, the flap in the closed position impeding movement of the movable arm, and not impeding the movement when in the open position.

12. The aircraft according to claim 1, wherein the wing includes at least one deflector for deflecting a stream of air that might impact against the winch device.

13. The aircraft according to claim 1, wherein the aircraft is an aircraft suitable for performing hovering flight.

14. An aircraft comprising:

a wing extending longitudinally from a streamlined leading edge towards a streamlined trailing edge, a winch provided with a hoist including a storage drum, the winch provided with a suspension member extending from a first end to a second end that is free and that projects from the hoist, the hoist including a motor for winding the suspension member around the storage drum and for unwinding the suspension member off the storage drum, the hoist being at least partially surrounded by a fairing of the wing, the hoist disposed in an inside volume of the wing in a streamlined position, wherein the winch includes a movable arm carried by a hinge, the hinge giving the movable arm at least one degree of freedom to move in rotation about an axis of rotation relative to the wing, the hoist being carried by the movable arm, and the movable arm and the fairing being movable together between the streamlined position and an extended position.

15. The aircraft according to claim 14, wherein the fairing is a fuselage fairing of the wing.

16. The aircraft according to claim 14, wherein the hoist is disposed in one of the streamlined edges of the wing, the fairing is a portion of the streamlined edge containing the hoist.

17. The aircraft according to claim 16, wherein the wing carries a propeller arranged longitudinally beside one of the streamlined edges, and the hoist is disposed in the other streamlined edge.

18. The aircraft according to claim 16, wherein the streamlined edge containing the hoist comprises in succession a root segment, the fairing, and then an end segment.

19. The aircraft according to claim 14, wherein the suspension member passes through the fairing.

20. The aircraft according to claim 14, wherein, in the streamlined position, the fairing closes the inside volume, and, in the extended position, the fairing opens the inside volume to a medium outside the aircraft.

* * * * *